US011852891B2

(12) United States Patent
Chen et al.

(10) Patent No.: US 11,852,891 B2
(45) Date of Patent: Dec. 26, 2023

(54) LASER PROCESSING DEVICE AND METHOD FOR PROCESSING A WORKPIECE

(71) Applicant: Delta Electronics, Inc., Taoyuan (TW)

(72) Inventors: Hung-Wen Chen, Taoyuan (TW); Ren-Feng Ding, Taoyuan (TW); Shih-Yung Chiu, Taoyuan (TW); Shu-Han Wu, Taoyuan (TW); Keng-Ning Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 333 days.

(21) Appl. No.: 17/182,653

(22) Filed: Feb. 23, 2021

(65) Prior Publication Data

US 2022/0082787 A1   Mar. 17, 2022

(30) Foreign Application Priority Data

Sep. 15, 2020 (CN) .......................... 202010967439.7

(51) Int. Cl.
*G02B 7/09* (2021.01)
*G02B 27/10* (2006.01)
(Continued)

(52) U.S. Cl.
CPC ............ *G02B 7/09* (2013.01); *B23K 26/0648* (2013.01); *G01C 3/08* (2013.01); *G01J 1/4257* (2013.01);
(Continued)

(58) Field of Classification Search
CPC .. G02B 7/09; G02B 19/0009; G02B 19/0047; G02B 27/106; G02B 7/08; G02B 7/36;
(Continued)

(56) References Cited

U.S. PATENT DOCUMENTS

| 2010/0219171 A1* | 9/2010 | Sato ....................... B23K 26/04 219/121.75 |
| 2014/0197140 A1* | 7/2014 | Unrath ................... B23K 26/03 219/121.62 |

FOREIGN PATENT DOCUMENTS

| CN | 111065947 A | * | 4/2020 | ............ B23K 26/032 |
| CN | 111299825 A | * | 6/2020 | ......... B23K 26/0869 |

(Continued)

OTHER PUBLICATIONS

Office Action dated Oct. 6, 2021 in TW Application No. 109131596, 6 pages.

*Primary Examiner* — Dana Ross
*Assistant Examiner* — Joseph W Iskra
(74) *Attorney, Agent, or Firm* — Muncy, Geissler, Olds & Lowe, P.C.

(57) ABSTRACT

A laser processing device for processing a workpiece is provided, including a laser emitter, a lens module, a driving module, a camera module, and a processing unit. The lens module has a first lens and a second lens, wherein the laser emitter emits a laser beam through the first and second lenses to the workpiece. The driving module drives the first lens to move relative to the second lens. The camera module captures an image of the workpiece. The processing unit is electrically connected to the camera module and the driving module, wherein the camera module transmits an image signal to the processing unit according to the image of the workpiece, and the processing unit transmits a driving signal to the driving module according to the image signal, driving the first lens to move relative to the second lens. A method for processing a workpiece is also provided.

12 Claims, 4 Drawing Sheets

(51) Int. Cl.
*G01J 1/42* (2006.01)
*B23K 26/06* (2014.01)
*G02B 19/00* (2006.01)
*G01C 3/08* (2006.01)

(52) U.S. Cl.
CPC ..... *G02B 19/0009* (2013.01); *G02B 19/0047* (2013.01); *G02B 27/106* (2013.01)

(58) Field of Classification Search
CPC  B23K 26/0648; B23K 26/032; B23K 26/046; B23K 26/064; B23K 26/0643; G01C 3/08; G01J 1/4257; B22F 10/28; B22F 10/36; B22F 12/41; B22F 12/44; B22F 12/45; B22F 12/49; B22F 12/80; B28B 1/001; B28B 17/0081; B29C 64/153; B29C 64/20; B29C 64/264; B29C 64/277; B29C 64/282; B29C 64/393; B33Y 10/00; B33Y 30/00; B33Y 50/02; Y02P 10/25
USPC .................................................. 219/121.61
See application file for complete search history.

(56) References Cited

FOREIGN PATENT DOCUMENTS

| | | | | |
|---|---|---|---|---|
| DE | 102020211343 | A1 | * | 3/2022 |
| JP | 2006315031 | A | * | 11/2006 |
| JP | 2019192757 | A | * | 10/2019 |
| WO | WO-2017130953 | A1 | | 8/2017 |

* cited by examiner

LASER PROCESSING DEVICE AND METHOD FOR PROCESSING A WORKPIECE

CROSS REFERENCE TO RELATED APPLICATIONS

This Application claims priority of China Patent Application No. 202010967439.7 filed on Sep. 15, 2020, the entirety of which is incorporated by reference herein.

BACKGROUND OF THE INVENTION

Field of the Invention

The application relates in general to a laser processing device, and in particular, to a laser processing device that can adjust the size of a laser spot projected on a solder pad.

Description of the Related Art

In a conventional laser soldering process, a lens module with several optical lenses is provided for guiding and focusing the laser light in the desired area. The conventional laser soldering device is used for processing different solder pads of various sizes, and if the laser spot is too small, the solder pads may not be evenly heated. Conversely, if the laser spot is too large, the printed circuit board may be burned or damaged by the heat.

FIG. 1 is a perspective diagram showing a solder pad S on a substrate B (e.g. printed circuit board, PCB) that is processed by a conventional laser processing device 10. As shown in FIG. 1, the conventional laser processing device 10 has one or several lenses 11. It should be noted that a laser emitter inside the laser processing device 10 emits a laser beam E through the lens 11, and the laser beam E is then focused on the solder pad S (as the laser beam E' shown in FIG. 1).

Still referring to FIG. 1, the solder pad S on the substrate B has a diameter Ld, and the laser beam E' emitted from the laser emitter can be focused on the solder pad S to form a laser spot, so that the size of the laser spot S is equal to the size of the solder pad S. Since the lens 11 cannot move in the conventional laser processing device 10, when the size of the laser spot has to be adjusted, the whole laser processing device 10 has to be moved relative to the substrate B to achieve appropriate focusing of the laser beam E'. However, this may cause inconvenient usage and reduce the production efficiency.

For at least the reasons mentioned above, how to design a laser processing device that has high efficiency and flexible usage becomes a challenge.

BRIEF SUMMARY OF INVENTION

In view of the aforementioned problems, the object of the invention is to provide a laser processing device for processing a workpiece. The laser processing device includes a laser emitter, a lens module, a driving module, a camera module, and a processing unit. The lens module has a first lens and a second lens, wherein the laser emitter emits a laser beam through the first and second lenses to the workpiece. The driving module drives the first lens to move relative to the second lens. The camera module captures an image of the workpiece. The processing unit is electrically connected to the camera module and the driving module, wherein the camera module transmits an image signal to the processing unit according to the image of the workpiece, and the processing unit transmits a driving signal to the driving module according to the image signal, driving the first lens to move relative to the second lens.

In some embodiments, the laser processing device further includes a power-measurement module to measure the power of the laser beam.

In some embodiments, the laser processing device further includes a splitter, wherein part of the laser beam emitted from the laser emitter is reflected by the splitter to the workpiece, and another part of the laser beam propagates through the splitter to the power-measurement module.

In some embodiments, the laser processing device further includes a mirror, wherein the laser beam emitted from the laser emitter is reflected by the mirror and propagates through the lens module to the splitter.

In some embodiments, the laser processing device further includes a motor, a stage, and a lead screw connected to the motor and the stage, the first lens is disposed on the stage, and the motor drives the lead screw to rotate so that the stage moves relative to the lead screw along the optical axis of the first lens.

In some embodiments, the laser processing device further includes a splitter, wherein part of the laser beam emitted from the laser emitter is reflected by the splitter to the workpiece.

In some embodiments, external light is reflected by the workpiece and propagates through the splitter to the camera module.

In some embodiments, the laser processing device further includes two mirrors, wherein the external light is reflected by the workpiece and propagates through the splitter, and the external light is then sequentially reflected by the two mirrors to the camera module.

In some embodiments, the laser processing device further includes a distance-measurement device for measuring the distance between the laser processing device and the workpiece, wherein the distance-measurement device transmits a position signal to the processing unit according to the distance between the laser processing device and the workpiece.

In some embodiments, the processing unit transmits a driving signal to the driving module according to the position signal and the image signal, so that the first lens is driven by the driving module to move relative to the second lens.

In some embodiments, the laser processing device includes a laser cutting machine, a laser drilling machine, a laser soldering machine, or a laser welding machine.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the laser processing device and the method for processing a workpiece are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
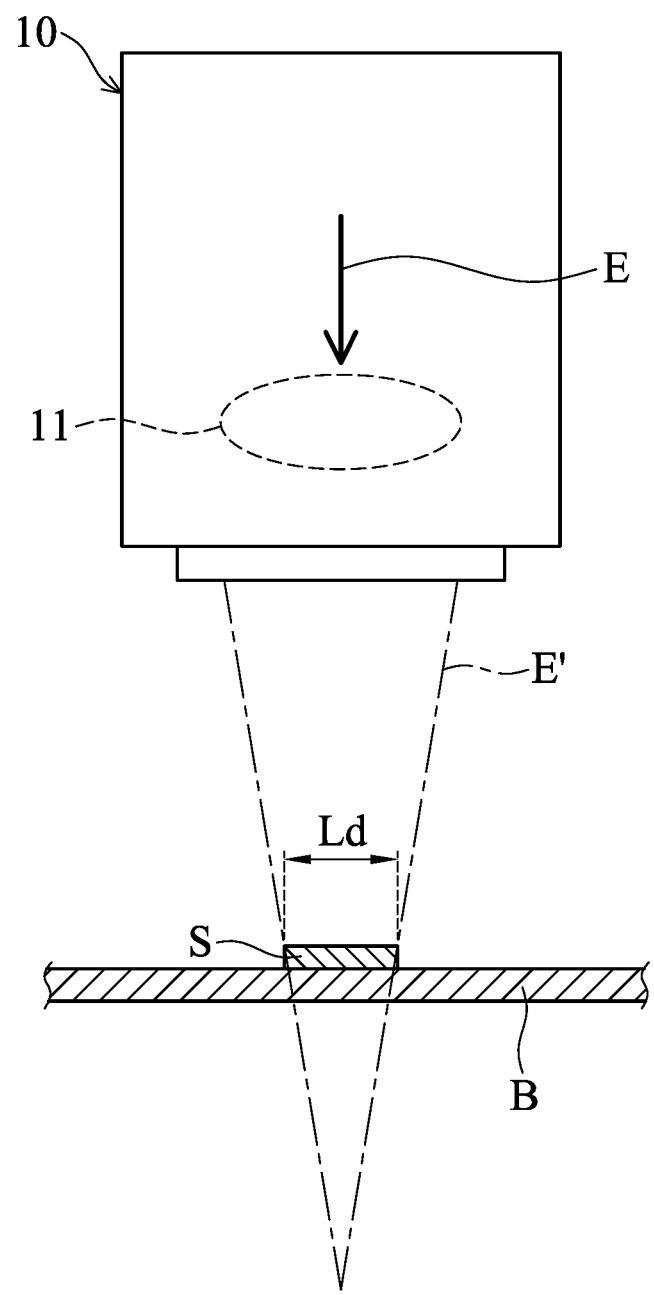
FIG. 1 is a perspective diagram showing a solder pad S on a substrate B (e.g. printed circuit board, PCB) that is processed by a conventional laser processing device 10.
Figure 2:
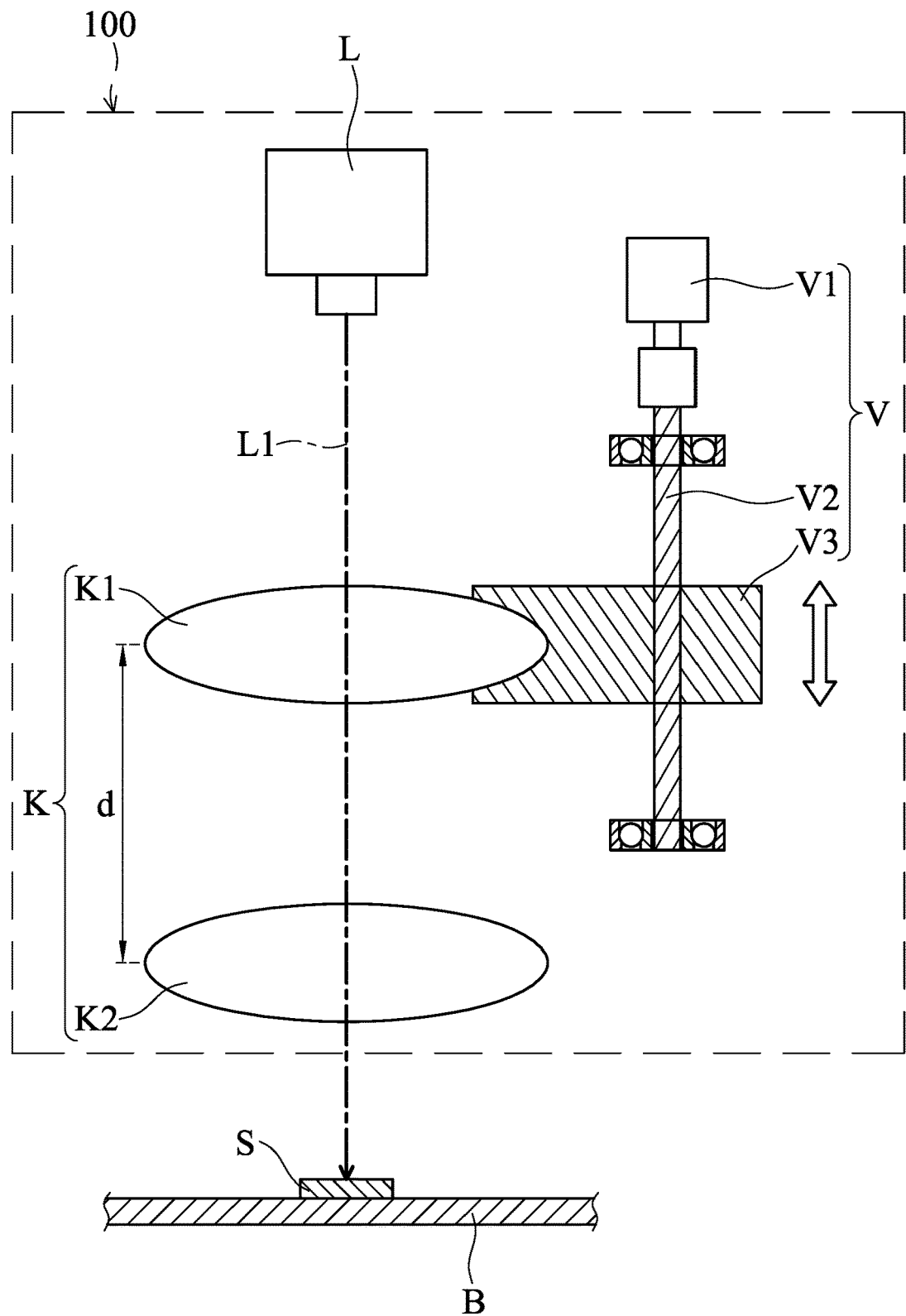
FIG. 2 is a perspective diagram showing a solder pad S on a substrate B (e.g. printed circuit board, PCB) that is processed by a laser processing device 100, in accordance with an embodiment of the invention.

FIG. 2 is a perspective diagram showing a solder pad S on a substrate B (e.g. printed circuit board, PCB) that is processed by a laser processing device 100, in accordance with an embodiment of the invention. As shown in FIG. 2, the laser processing device 10 in this embodiment primarily comprises a laser emitter L, a driving module V, and a lens module K. The lens module K comprises a first lens K1 and a second lens K2. The laser emitter L of the laser processing device 100 can emit a laser beam L1 sequentially through the first and second lenses K1 and K2. The laser beam L1 can be focused on the solder pad S for laser soldering.

Still referring to FIG. 2, the driving module V primarily comprises a motor V1, a lead screw V2 (e.g. ball lead screw), and a stage V3. The first lens K1 is disposed on the stage V3, the second lens K2 is fixed in the laser processing device 100, and the lead screw V2 is connected to the motor V1 and the stage V3. When performing the soldering process on different solder pads S, the laser spot of the laser beam L1 projected onto the solder pads S needs to be adjusted and resized accordingly. It should be noted that the motor V1 of the driving module V can drive the lead screw V2 to rotate, so that the stage V3 and the first lens K1 can be moved together relative to the lead screw V2 along the optical axis of the first lens K1, as the arrows indicate in FIG. 2. Therefore, the distance d between the first and second lenses K1 and K2 can be changed, and the laser spot of the laser beam L1 projected onto the solder pad S can be appropriately resized corresponding to the solder pad S.

Figure 3:
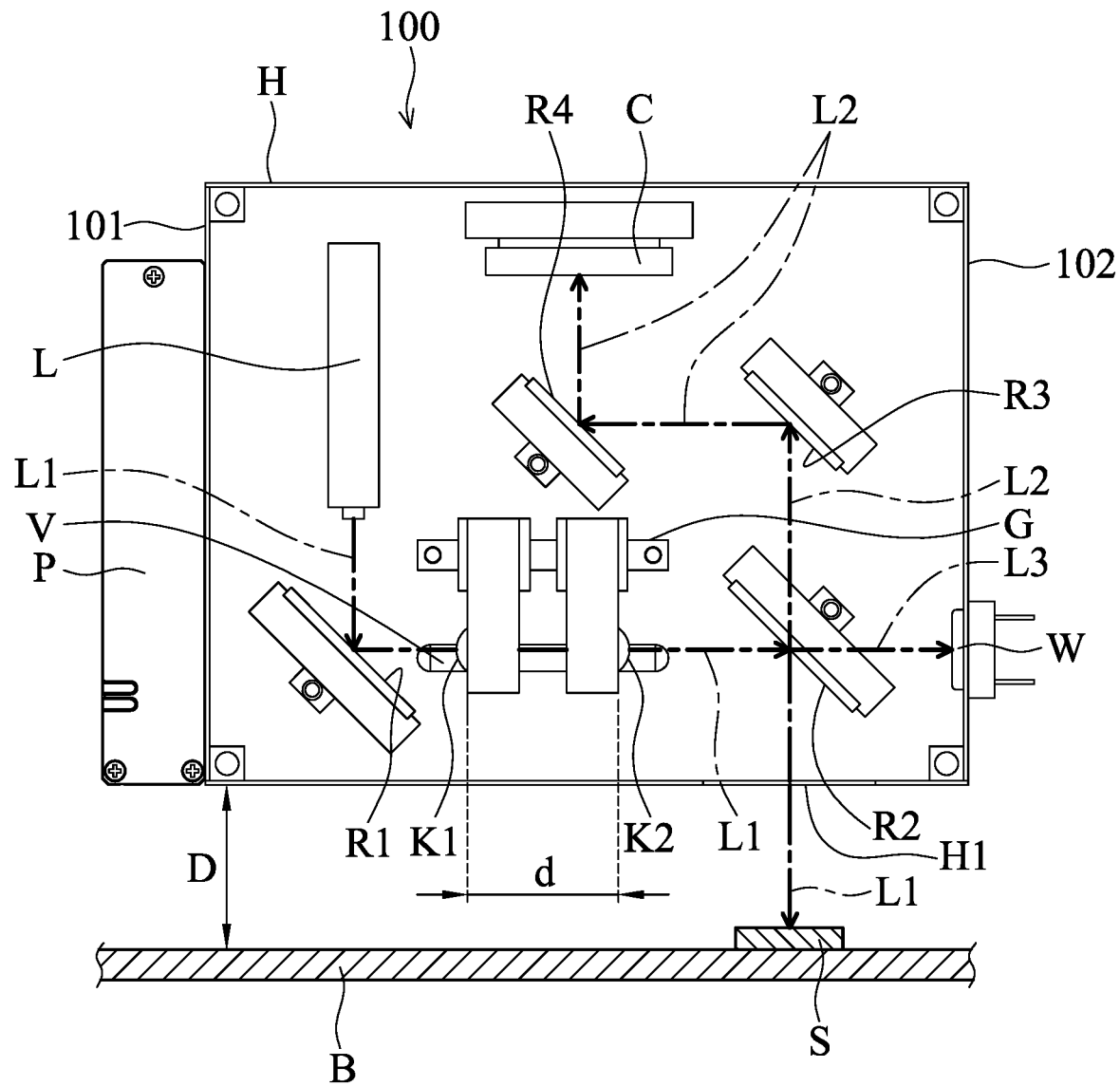
FIG. 3 is a perspective diagram showing a solder pad S on a substrate B (e.g. printed circuit board, PCB) that is processed by a laser processing device 100, in accordance with another embodiment of the invention.

FIG. 3 is a perspective diagram showing a solder pad S on a substrate B (e.g. printed circuit board, PCB) that is processed by a laser processing device 100, in accordance with another embodiment of the invention. As shown in FIG. 3, this embodiment is different from FIG. 2 in that the laser processing device 100 further comprises a housing H, a camera module C, a distance-measurement device P, and a power-measurement module W. The laser emitter L and the camera module C are disposed in the housing H. The distance-measurement device P is disposed on a first side 101 of the housing H, and the power-measurement module W is disposed on a second side 102 of the housing H.

In this embodiment, the distance-measurement device P may comprise a laser displacement meter for measuring the distance D between the laser processing device 100 and the substrate B (workpiece). The power-measurement module W may comprise an optical power meter for detecting the output power of the laser beam, and the substrate B may comprise a printed circuit board (PCB).

During the laser soldering process, the laser emitter L can generate a laser beam L1. The laser beam L1 is reflected by a mirror R1 and propagates through the first and second lenses K1 and K2 to a splitter R2. Subsequently, a part of the laser beam L1 is reflected by the splitter R2 and propagates through an opening H1 of the housing H to the substrate B, so as to perform laser soldering on the solder pad S. Another part of the laser beam L1 propagates through the splitter R2 to the power-measurement module W, as the light L3 indicates in FIG. 3, so that the output power of the laser beam can be monitored by the power-measurement module W during the laser soldering process.

Additionally, external light can be reflected by the substrate B and enter the housing H through the opening H1, and then propagate through the splitter R2 to the mirror R3, as light L2 indicates in FIG. 3. Subsequently, light L2 is reflected by another mirror R4 to the camera module C, whereby the camera module C can capture an image of the substrate B (e.g. including the image of the solder pad S on a surface of the substrate B) to calculate the ideal size of the laser spot.

Specifically, a guiding rail G is provided on the inner surface of the housing H, wherein the first and second lenses K1 and K2 can be driven by the driving module V as shown in FIG. 2 to slide along the guiding rail G, so as to appropriately adjust the distance d between the first and second lenses K1 and K2 along the optical axis thereof (X direction). Thus, the laser beam L1 generated by the laser emitter L can form a laser spot on the surface of the substrate B that has a size corresponding to the solder pad S.

Figure 4:
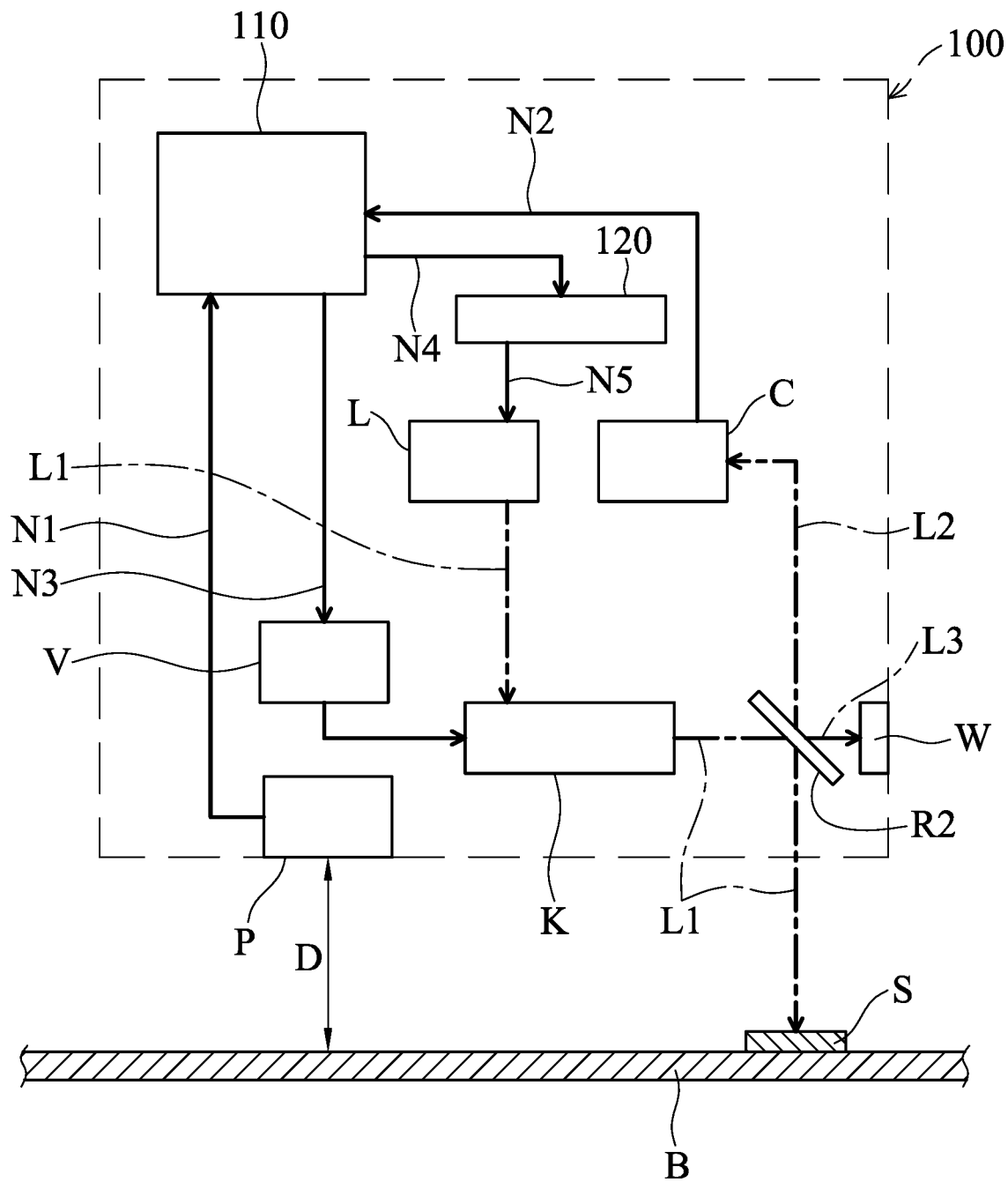
FIG. 4 is a block diagram showing a solder pad S on a substrate B (e.g. printed circuit board, PCB) that is processed by a laser processing device 100, in accordance with another embodiment of the invention.

FIG. 4 is a block diagram showing a solder pad S on a substrate B (e.g. printed circuit board, PCB) that is processed by a laser processing device 100, in accordance with another embodiment of the invention. As shown in FIG. 4, this embodiment is different from FIG. 3 in that the laser processing device 100 further comprises a processing unit 110 and a laser controller 120, wherein the processing unit 110 may comprise an industrial PC (IPC) that is electrically connected to the distance-measurement device P, the camera module C and the driving module V, and the laser controller 120 is electrically connected to the processing unit 110 and the laser emitter L.

Before the laser soldering process, the distance-measurement device P can measure the distance D between the laser processing device 100 and the substrate B. Subsequently, the distance-measurement device P can transmit a position signal N1 to the processing unit 110 according to the distance D between the laser processing device 100 and the substrate B, wherein the position signal N1 includes information of the height of the laser processing device 100 relative to the substrate B (workpiece). Meanwhile, external light can be reflected by the solder pad S on the substrate B into the laser processing device 100, and then propagate through the splitter R2 (as light L2 indicates in FIG. 4) to the camera module C. Therefore, the camera module C can capture an image on a surface of the substrate B (e.g. including the image of the solder pad S), and then transmit an image signal N2 to the processing unit 110 according to the image captured by the camera module C.

Hence, the processing unit 110 can calculate the ideal size of the laser spot projected onto the solder pad S using the position signal N1 and the image signal N2. The processing unit 110 then transmits a driving signal N3 to the driving module V. Therefore, the lenses (e.g. the first and second lenses K1 an K2) in the lens module K can be moved relative to each other via a connection mechanism (e.g. lead screw) of the driving module V, whereby the distance between the lenses can be appropriately adjusted.

Finally, the processing unit 110 can transmit a control signal N4 to the laser controller 120, and the laser controller 120 can transmit a trigger signal N5 to the laser emitter L, whereby the laser emitter L emits the laser beam L1 to the lens module K.

Still referring to FIG. 4, a part of the laser beam L1 is reflected by the splitter R2 and propagates through an opening H1 of the housing to the substrate B, so as to perform laser soldering on the solder pad S. Another part of the laser beam L1 propagates through the splitter R2 to the power-measurement module W, as light L3 indicates in FIG. 4, so that the output power of the laser beam L1 can be monitored by the power-measurement module W during the laser soldering process.

In summary, the invention provides a laser processing device 100 for processing a workpiece (e.g. to perform laser soldering on the solder pads S of a substrate B). In some embodiments, a camera module C is provided to capture an image of a solder pad S on a substrate B, and a processing unit 110 (e.g. IPC) automatically calculates the ideal size of the laser spot projected onto the solder pad S according the image captured by the camera module C, reducing the amount of human effort required by the process. As human error and misjudgment can be avoided, intelligent manufacturing can be also achieved. In some embodiments, the laser processing device may comprise a laser cutting machine, a laser drilling machine, a laser soldering machine, or a laser welding machine.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A laser processing device for processing a workpiece, comprising:
 a laser emitter;
 a lens module, having a first lens and a second lens, wherein the laser emitter emits a laser beam through the first and second lenses to the workpiece;
 a driving module, driving the first lens to move relative to the second lens;
 a camera module, capturing an image of the workpiece;
 a processing unit, electrically connected to the camera module and the driving module, wherein the camera module transmits an image signal to the processing unit according to the image of the workpiece, and the processing unit transmits a driving signal to the driving module according to the image signal, driving the first lens to move relative to the second lens;
 a power-measurement module for measuring a power of the laser beam; and
 a splitter, wherein a part of the laser beam emitted from the laser emitter is reflected by the splitter to the workpiece, and another part of the laser beam propagates through the splitter to the power-measurement module, wherein external light is reflected by the workpiece and propagates through the splitter to the camera module.

2. The laser processing device as claimed in claim 1, further comprising a mirror, wherein the laser beam emitted from the laser emitter is reflected by the mirror and propagates through the lens module to the splitter.

3. The laser processing device as claimed in claim 1, wherein the driving module comprises a motor, a stage, and a lead screw connected to the motor and the stage, the first lens is disposed on the stage, and the motor drives the lead screw to rotate so that the stage moves relative to the lead screw along an optical axis of the first lens.

4. The laser processing device as claimed in claim 1, further comprising two mirrors, wherein the external light is reflected by the workpiece and propagates through the splitter, and the external light is then sequentially reflected by the two mirrors to the camera module.

5. The laser processing device as claimed in claim 1, further comprising a distance-measurement device for measuring a distance between the laser processing device and the workpiece, wherein the distance-measurement device transmits a position signal to the processing unit according to the distance between the laser processing device and the workpiece.

6. The laser processing device as claimed in claim 5, wherein the processing unit transmits a driving signal to the driving module according to the position signal and the image signal, so that the first lens is driven by the driving module to move relative to the second lens.

7. The laser processing device as claimed in claim 1, wherein the laser processing device comprises a laser cutting machine, a laser drilling machine, a laser soldering machine, or a laser welding machine.

8. A method for processing a workpiece, comprising steps of:
- providing a laser emitter;
- providing a lens module, wherein the lens module has a first lens and a second lens, and the laser emitter emits a laser beam through the first and second lenses to the workpiece;
- driving the first lens to move relative to the second lens by a driving module;
- capturing an image of the workpiece by a camera module;
- providing a processing unit that is electrically connected to the camera module and the driving module, wherein the camera module transmits an image signal to the processing unit according to the image of the workpiece, and the processing unit transmits a driving signal to the driving module according to the image signal, driving the first lens to move relative to the second lens;
- providing a power-measurement module for measuring a power of the laser beam; and
- providing a splitter, wherein a part of the laser beam emitted from the laser emitter is reflected by the splitter to the workpiece, and another part of the laser beam propagates through the splitter to the power-measurement module, wherein external light is reflected by the workpiece and propagates through the splitter to the camera module.

9. The method as claimed in claim 8, further comprising a step of:
- providing a mirror, wherein the laser beam emitted from the laser emitter is reflected by the mirror and propagates through the lens module to the splitter.

10. The method as claimed in claim 8, wherein the driving module comprises a motor, a stage, and a lead screw connected to the motor and the stage, the first lens is disposed on the stage, and the motor drives the lead screw to rotate so that the stage moves relative to the lead screw along an optical axis of the first lens.

11. The method as claimed in claim 8, further comprising a step of:
- providing two mirrors, wherein the external light is reflected by the workpiece and propagates through the splitter, and the external light is then sequentially reflected by the two mirrors to the camera module.

12. The method as claimed in claim 8, wherein the processing unit transmits a driving signal to the driving module according to the position signal and the image signal, so that the first lens is driven by the driving module to move relative to the second lens.

\* \* \* \* \*